Oct. 2, 1951

O. WITTEL 2,570,176

FILM LOOP FORMER

Filed April 24, 1948

OTTO WITTEL
INVENTOR

BY
ATTORNEYS

Oct. 2, 1951

O. WITTEL 2,570,176

FILM LOOP FORMER

Filed April 24, 1948

OTTO WITTEL
*INVENTOR*

BY
ATTORNEYS

Patented Oct. 2, 1951

2,570,176

UNITED STATES PATENT OFFICE 2,570,176

FILM-LOOP FORMER

Otto Wittel, Rochester, N. Y., assignor to Eastman Kodak Company, Rochester, N. Y., a corporation of New Jersey Application April 24, 1948, Serial No. 23,096

8 Claims. (Cl. 271—2.2)

The present invention relates to photography and particularly to a device for forming and/or maintaining the film loops in a motion picture apparatus adjacent the film gate through which a film strip is intermittently moved.

This application is a continuation-in-part of patent application Serial No. 774,824, filed September 18, 1947 (now abandoned), in my name.

As is well known in the art, in motion picture apparatus in which the film strip is moved intermittently past a film gate for projection or photographing purposes, the film strip is usually pulled from the supply reel and fed to the take-up reel by one or more constantly rotating sprockets engaging perforations in the margin of the strip. In order to permit the proper operation of the intermittent pull-down mechanism at the gate, it is necessary to provide a film loop in advance of, and behind, the gate, so that the constant feed, or pull, of the sprockets will not prevent the proper operation of the intermittent pull-down mechanism. The loop, in advance of the gate, provides a free supply of film from which the pull-down mechanism can readily draw film, and, if this loop becomes lost, then the pull-down claw pulls directly against the sprocket and either the perforations or the pull-down is damaged. On the other hand, if the lower loop, or the one behind the gate, becomes lost, then the constantly driven sprocket tends to pull the film continuously through the gate and the picture on the screen begins to jump, and the film perforations, and/or pull-down mechanism, are damaged because the sprocket is working against the pull-down mechanism. The loss of these film loops may result from different causes, including improper threading, damaged film perforations, which prevent the pull-down from feeding the film properly, etc.

I am aware that the prior art shows many different forms of loop-forming and loop-maintaining mechanisms. However, the majority of these are not automatic and those that are, are rather complicated and expensive in construction.

My loop-forming device comprises an eccentrically mounted roller disposed in the film loop to be maintained and arranged so that its larger radius is normally disposed away from, or remote with respect to, the end of the loop when the loop is of proper size. If the film loop diminishes in size sufficiently to engage the shorter radius of the roller, then the roller is given a single rotation by the moving film, whereupon the long radius of the roller reforms the film loop.

I am aware that the prior art shows an eccentrically mounted roller disposed in the film loop for this same purpose. My device, however, is an improvement over this prior art in that I mount the roller in such a way that it is counterbalanced to normally assume an inoperative position wherein its larger radius is remote from the end of the film loop and is completely free from rubbing engagement with the film at all times when the loop is of such a size as will be formed by a rotation of the roller. This not only prevents the film surface from constantly rubbing against the surface of the roller on the leaving side of the loop and resulting in a scratching of the film, but it also permits the use of such a loop-forming device on a reversible projector without danger of the film picking up this roller immediately upon being reversed, whereupon the roller would act as a snubber for the film in the loop and oppose the intermittent pull-down to cause a tearing of the film perforations. Furthermore, the loop-forming roller of my device includes a pair of spaced rubber tires which engage the film strip only at the marginal areas carrying the film perforations so that all danger of marring the picture area of a film is eliminated.

One object of the present invention is to provide a simple and efficient device for maintaining the loop in a motion picture apparatus behind the film gate which is adaptable for use on apparatus in which film strip is capable of being reversed in direction of movement and which will not mar the picture area of the film.

Another object is to provide a loop-forming device of the type referred to and which comprises an eccentrically mounted roller disposed in the loop and movable by the film so that the larger radius of the roller will restore, or form, the loop in substantially one revolution and will then assume a normal position in which it is free from engagement with said film strip during normal operation of the apparatus.

And yet, another object is to provide a loop-forming roller of the type described which engages the film only at the perforated margins at any time and does not contact the picture area of the film.

Another object is to provide a loop-forming roller of the type described which is so designed and/or arranged that after the roller has been engaged by the film and has been given one revolution to form or restore the loop, it will not be again thrown into driving engagement with that portion of the film entering the loop due to its own inertia and thus be subjected to another and useless revolution. In other words, the roller will not continue to rotate, or be rotated, after having been engaged by a fore-shortened loop of film.

And a further object is to provide said loop-forming roller with a friction catch, or latch, which acts to stop and/or hold the roller in its full counterbalanced position after it has completed one revolution.

The novel features that I consider characteristic of my invention are set forth with particularity in the appended claims. The invention itself, however, both as to its organization and its methods of operation, together with additional objects and advantages thereof, will best be understood from the following description of the specific embodiments when read in connection with the accompanying drawing, in which Fig. 1 is a diagrammatic side elevational view of the parts of a motion picture projector essential to a disclosure of the present invention and showing a preferred embodiment of my loop-forming roller in its normal or inoperative position;

Figs. 2, 3, and 4 are enlarged diagrammatic views of the film-forming roller and lower film sprocket with the film passing therebetween, and illustrating how the film roller is moved by the film to reform the loop when the loop becomes fore-shortened;

Figure 8:
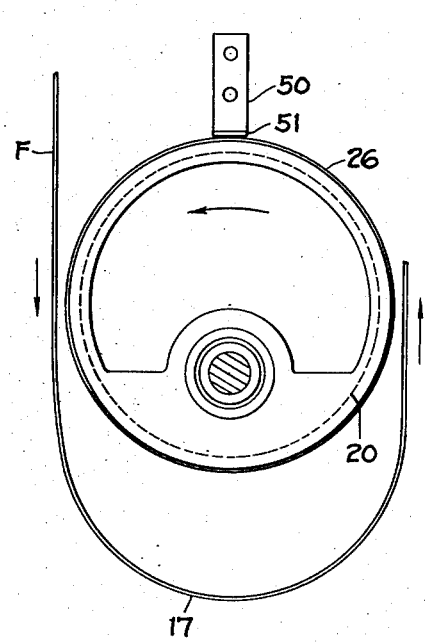
Figure 9:
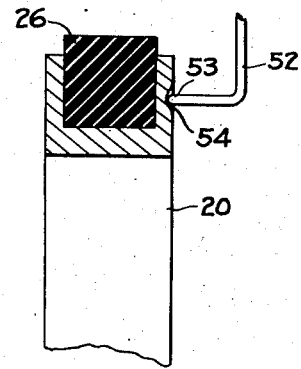

Fig. 8 shows another modification for preventing an accidental or continued rotation of the loop-forming roller due to its inertia. This modification consists of a friction catch, or latch, for stopping and holding the loop-forming roller in a counterbalanced position; and Fig. 9 is an enlarged partial vertical section taken on a portion of one rim of the loop-forming roller and showing another modification of a friction catch, or latch, which might be used to locate the roller in its counterbalanced position.

Like reference characters refer to corresponding parts throughout the drawings.

Figure 1:
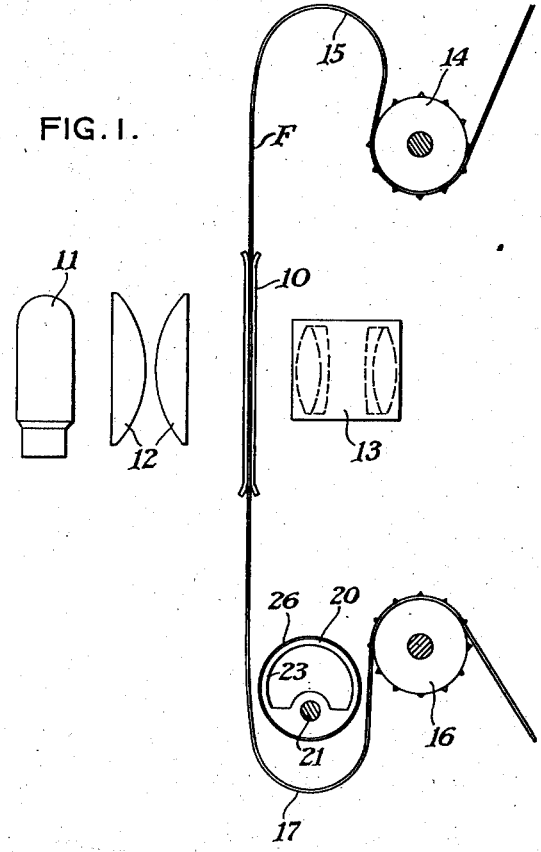

Referring now to Fig. 1, a motion picture projector is shown as comprising a film gate 10 through which a film strip F is intermittently moved past a projection aperture (not shown) by any sort of suitable intermittent pull-down mechanism, not shown. The projection aperture in the gate is illuminated by an illuminating system which may include a lamp 11 and a condenser assembly 12, while the illuminated frame of the film strip, in alignment with the projection aperture, is projected onto a screen by an objective 13.

The film strip is pulled from a supply reel (not shown) by a constantly rotated sprocket 14 and is fed into a loop 15 in advance of the gate, and from which loop the film is drawn by the pull-down mechanism, as is well known. The film strip, upon leaving the gate, is fed over a constantly rotated sprocket 16 which feeds it to the take-up reel, not shown.

To permit the pull-down mechanism to properly feed the film, it is necessary to provide a free loop 17 in the film behind the gate and in advance of the sprocket 16. If this loop 17 becomes lost, or becomes of insufficient size, the sprocket 16 will tend to pull the film strip directly through the gate, irrespective of the pull-down mechanism, and the picture on the screen will appear to jump, and the film perforations may become torn and/or the pull-down mechanism may be damaged. This loss of loop may be caused by torn perforations in the film or may be caused by improper threading of the machine, and it is usually necessary to stop the projector to readjust the loop if no loop-forming mechanism is provided, or, if one is provided, manual operation thereof by the operator is required.

Figure 6:
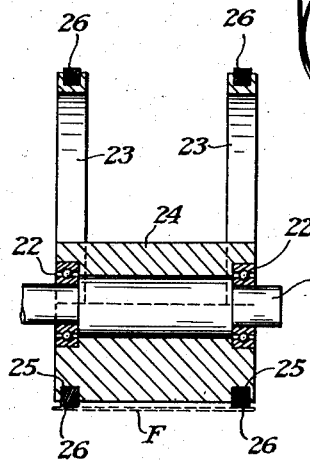
Fig. 6 is a vertical section taken substantially through the axis of the roller shown in Fig. 5.

In accordance with the present invention, a loop-forming roller 20 is disposed within the lower film loop 17 and has its axis parallel to the axis of said loop. This roller 20 is eccentrically mounted on a fixed stub shaft 21 by means of free-running bearings, shown as ball bearings 22 in Figs. 6 and 7, so that it can rotate freely. This roller 20 is mounted so that it normally assumes the position shown in Fig. 1 wherein its larger radius is remote from the end of the film loop 17 and the entire periphery of the roller is free from engagement with the film when the loop is of sufficient size for satisfactory operation of the pull-down mechanism.

Figure 2:
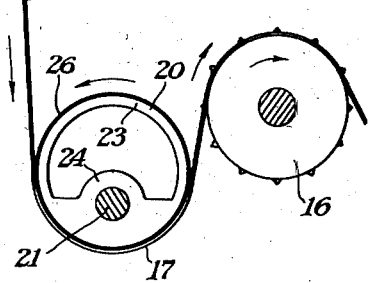
Figure 3:
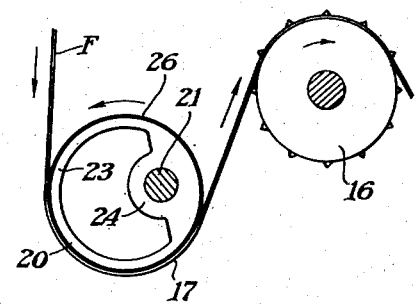
Figure 4:
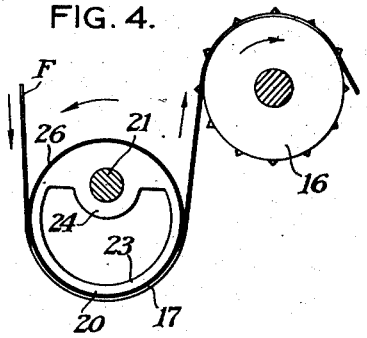

When the film loop 17 becomes lost for any reason whatsoever and the end thereof comes into engagement with the smaller radius of the roller, as shown in Fig. 2, the moving film strip immediately picks up the roller 20 and causes it to rotate in a counterclockwise direction. Looking at Figs. 3 and 4, it will be seen that as the larger radius of the roller moves around into the loop, it will increase the size of the same by pulling film through the gate, past the pull-down, and from the upper loop 15. Then, as the roller completes substantially one revolution and the larger radius is about to leave engagement with the film, the loop has been reformed and the roller returns to its normal position, shown in Fig. 1, where it is free from engagement with the film strip.

Figure 5:
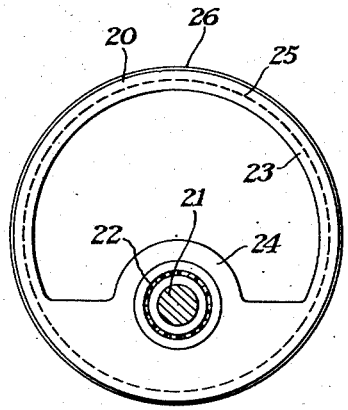
Fig. 5 is an enlarged side elevational view of the loop-forming roller and the shaft on which it is mounted.

In order to insure the roller moving to its normal position and remaining there, out of engagement with the film, I have found it desirable and necessary to mount the roller for free rotation and to counterbalance it so that it will assume this normal position. This I have done by cutting away the body or mass of the roller 20 on the long radius side of its axis to leave only rims 23 joined by a web 24 having sufficient strength to give the roller the necessary rigidity and to provide a support for the bearings 22. (See Figs. 5 and 6.) The mass or body of the roller on the short radius side of the axis is left completely intact and may even be loaded, if such a step is necessary to obtain the necessary counterbalancing effect. If the roller is so counterbalanced, it will immediately move to its normal position as the long radius moves out of contact with the film and it will be prevented from freely rotating beyond its normal position so that its long radius will again engage the film and the roller will continue to rotate.

I have found that this counterbalanced mounting of the roller is preferable to frictionally restraining the movement thereof to prevent continued rotation, because if the roller is frictionally restrained by an amount sufficient to prevent its continued rotation, then the long radius will never become completely disengaged from the film-leaving side of the loop, but will continue to ride upon it lightly. While the only damage this might cause, when the projector is operating in a forward direction, is that the picture area of the film will be scratched, it is completely unsuitable and inoperative on a reversible type of projector where the film is moved in the opposite direction through the gate to obtain trick effects. This is so because the instant the projector is reversed, the film will pick up the roller and rotate it in a counter-clockwise direction regardless of the fact that the film loop is of sufficient size. This causes the larger radius of the roller to fill the loop and act as a snubber so that the pull-down mechanism cannot feed the film. This condition will persist until the upper loop 15 is gone and the upper sprocket 14 pulls the film through the gate by an amount sufficient to rotate the loop-forming roller clockwise by one revolution to remove the larger radius from the lower film loop. In the meantime, the pull-down mechanism has probably torn a number of perforations out of the film or itself has been damaged.

To obtain a satisfactory driving engagement between the roller and film, when the loop is lost, I have provided the margins of the periphery of the roll, including rims 23, with grooves 25 in which rubber tires 26, or other suitable friction material, are mounted. These tires are of such width and are so spaced apart that they are adapted to engage only the perforated margins of the film strip. Also the film-engaging faces of these tires extend above the periphery of the roller so that they will support the picture area of the film strip away from the periphery of the roller at all points so that the film will not be scratched. This is indicated by a dotted line designation of the film strip in Fig. 6.

Because of its frictionless mounting, this loop-forming roller has a tendency to rotate slightly past its full counterbalanced position after having been engaged by the fore-shortened film loop and to oscillate to its full counterbalanced position. I have found that when this roller is used in motion picture apparatus where the lack of space requires the reach of film entering the loop to be quite close to the periphery of the roller under normal running conditions, this slight tendency for the roller to move past its counterbalanced position sometimes causes the roller to move back into driving engagement with the reach of film entering the loop, with the result that the roller continues to rotate needlessly after having formed the loop.

Figure 7:
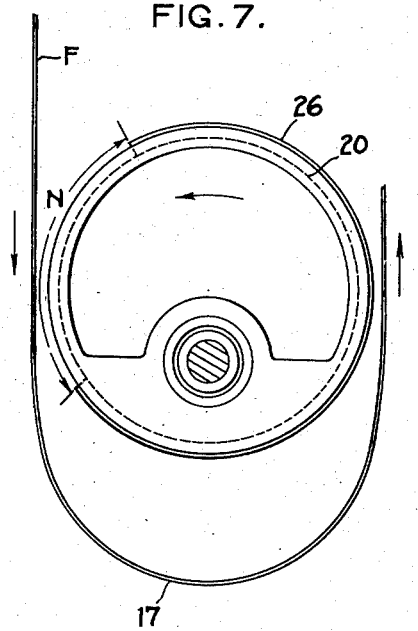
Fig. 7 is an enlarged side elevation of the loop-forming roller and the film loop, and showing how the rubber tires may be eliminated from a certain portion of the periphery of the roller to overcome the possibility of the roller being moved into driving engagement with the film due to its inertia after having made a single revolution.

I have devised, and will now describe, three different ways in which this difficulty can be overcome. In Fig. 7 I have shown the easiest way of overcoming this difficulty and one which is readily applicable to existing installations without any trouble. This modification consists in eliminating the rubber tires 26 from that portion of the periphery of the loop-forming roller 20 which is adjacent the reach of the film F entering the loop 17 when the roller is in its full counterbalanced position. In Fig. 7 this portion of the roller periphery is designated by arc N and extends through approximately 90° of the roller periphery. The length and location of this arc N from which the tires 26 are eliminated is not too critical, but it should include that portion of the roller periphery just above the horizontal axis which is apt to be moved into engagement with the film when the roller oscillates slightly beyond its full counterbalanced position due to the effect of its inertia. Then, that portion of the roller periphery from which the tires are eliminated is preferably rendered smooth and polished so that when it is moved into engagement with the reach of film entering the loop 17, it will not be picked up by the moving film and be given another rotation. It will be appreciated that the elimination of this portion of the friction surface on the roller periphery will not affect its intended function in any way, because, as the loop fore-shortens, it engages the lower side of the roller which includes the rubber tires, and a driving engagement between the film and roller will be set up. By the time the roller has rotated sufficiently to bring the smooth portion of its periphery into engagement with the lower end of the loop, the rubber-tired portion will be in engagement with the two vertical reaches of the film to continue the driving engagement. The only time this driving engagement will cease is when the roller has returned to, or has slightly passed, its true counterbalanced position and the loop has been re-formed to its normal size.

The same result may be obtained by the use of a friction catch, or latch, which acts to frictionally hold the loop-forming roller in its full counterbalanced position. In Figs. 8 and 9, I have shown two different types of friction catches which may be conveniently used.

In Fig. 8 I have shown a friction catch arrangement which comprises an L-shaped brake shoe 50 which is riveted, or otherwise fastened, to the mechanism plate of the apparatus on which the loop-forming roller is supported. One arm 51 of this brake shoe extends across the periphery of the loop-forming roller and is disposed to frictionally engage only that portion of the periphery which is most eccentric relative to the axis of the roller and at the instant the roller is in its full counterbalanced position. The brake shoe 50 is adjusted so that it produces a sufficient braking action on the roller to prevent it from passing its full counterbalanced position due to the inertia effect, but is not a sufficient braking action to prevent it from being picked up and rotated by the film when the loop fore-shortens and grips the lower portion of the roller. It will be appreciated that when using a friction catch of this type the rubber tires can, and preferably do, extend completely around the periphery of the roller.

In Fig. 9 I have shown another type of friction catch which may be used in place of that shown in Fig. 8, but which functions on the same principle. This friction catch comprises a spring finger 52 mounted on the mechanism plate of the apparatus and including a turned-up end 53 which rides on the end of the roller and which is adapted to snap into a recess, or depression, 54 in the end face of the roller when the same reaches its full counterbalanced position, as shown in Fig. 9. This arrangement is the equivalent of any spring detent mechanism which might be used and, in order to reduce the friction between the roller and the end of the spring finger 53 to a minimum, it might be found desirable to mount a ball bearing on the end of the spring finger, or its equivalent.

Although this device is primarily intended for use as a loop restorer and maintainer, it will be appreciated that it can be used as a means to facilitate the threading of a projector. For instance, if, in threading the projector, the film is placed tightly against the short radius of the roller 20, then the instant the projector drive is started, the film will pick up roller 20 and cause it to rotate and form the film loop. This operation will be accomplished while the leader of the film is passing the gate so that no objectionable jumping of an image on the screen will ensue.

While I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim is new and desire to secure by Letters Patent of the United States is:

1. A device for forming and maintaining a film loop in a motion picture apparatus comprising a shaft disposed within said loop and extending axially thereof, a loop-forming roller means for eccentrically mounting said roller on said shaft for unrestrained rotation thereon, means for counterbalancing said roller whereby the portion of its periphery farthest from said shaft will normally remain remote from the end of said loop, and raised frictional film-engaging surfaces on the periphery of said roller of such width and so spaced as to be adapted to be engaged only by the marginal areas of the film if said loop is sufficiently diminished, whereupon said roller will be rotated by movement of the film to restore said loop.

2. A device, according to claim 1, in which said shaft is fixed against rotation and said roller is mounted thereon by free running bearings, and in which the counterbalancing of said roller is accomplished by removing substantially all of the mass of said roller on the long radius side of the axis thereof and leaving only two narrow rim portions for supporting said raised film-engaging surfaces and a web portion joining said rim portions adjacent its axis of sufficient strength to constitute a support for said free running bearings.

3. A device for forming and maintaining a film loop in a motion picture apparatus comprising a shaft disposed within said loop and extending axially thereof, a roller freely and eccentrically journalled on said shaft, means for counterbalancing said roller whereby the portion of its periphery farthest from said shaft will normally remain remote from the end of said loop, a frictional driving surface on the periphery of said roller adapted to be engaged by the surface of said film if said loop becomes sufficiently diminished in size, whereupon said roller will be rotated by movement of the film to restore or form said loop, said frictional driving surface extending over only substantially three-quarters of the roller periphery, the remaining quarter of the roller periphery being smooth and being disposed so as to be located at the upper quadrant of the roller adjacent the reach of film entering said loop when the roller is in its counterbalanced position.

4. A device for forming and maintaining a film loop in a motion picture apparatus comprising a shaft disposed within said loop and extending axially thereof, a roller freely and eccentrically journalled on said shaft, means for counterbalancing said roller whereby the portion of its periphery farthest from said shaft will normally remain remote from the end of said loop, a frictional film-engaging surface on the periphery of said roller adapted to be engaged by the face of the film as said loop is sufficiently diminished in size, whereupon said roller will be rotated by movement of the film to restore or form said loop, and means adapted to selectively engage said roller for limiting it to a single rotation from its counterbalanced position at any one time due to its being engaged by the film due to a foreshortening of the film loop.

5. A device, according to claim 4, in which said means for limiting the roller to a single rotation comprises a friction restraining means adapted to engage and frictionally hold said roller in its counterbalanced position.

6. A device, according to claim 4, in which said means for limiting the roller to a single rotation comprises a fixed brake shoe disposed adjacent the periphery of said roller to frictionally engage the most eccentric portion thereof at the time said roller reaches its counterbalanced position.

7. A device, according to claim 4, in which said means for limiting the roller to a single rotation comprises providing the end of the roller with a depression, a spring-loaded detent fixed adjacent said roller to snap into said depression to frictionally restrain rotation of said roller, said depression and detent relatively disposed to come into engagement at the instant said roller is in its counterbalanced position.

8. A device for forming and maintaining a film loop in a motion picture apparatus comprising a shaft disposed within said loop and extending axially thereof, a roller freely and eccentrically journalled on said shaft to rotate between an operative position, wherein the portion of its periphery farthest from said shaft will lie adjacent and be engaged by the end of said loop, and an inoperative position, wherein said referred to portion of its periphery will be most remote from the end of said loop and the entire periphery of said roller is free from contact with the film, a frictional driving surface on the periphery of said roller adapted to be engaged by the film if said loop is sufficiently foreshortened, whereupon said roller will be rotated by movement of the film to restore said loop, and means for limiting said roller to a single rotation from its inoperative position at any one time due to its being engaged by the film and comprising a friction catch adapted to engage and frictionally hold said roller in its inoperative position.

OTTO WITTEL.

REFERENCES CITED

The following references are of record in the file of this patent:

UNITED STATES PATENTS

| Number | Name | Date |
| --- | --- | --- |
| 1,499,307 | Parkes | June 24, 1924 |
| 1,958,152 | Oechmichen | May 8, 1934 |
| 2,407,795 | Nelson | Sept. 17, 1946 |